May 19, 1964 H. B. LEWIS, JR 3,133,435

AIR DEAD WEIGHT TESTER

Filed May 28, 1956 3 Sheets-Sheet 1

INVENTOR.
HOWARD B. LEWIS, JR.
BY
Christie, Parker & Hale
ATTORNEYS

May 19, 1964  H. B. LEWIS, JR  3,133,435
AIR DEAD WEIGHT TESTER
Filed May 28, 1956  3 Sheets-Sheet 2

INVENTOR.
HOWARD B. LEWIS, JR.
BY
Christie, Parker & Hale
ATTORNEYS

May 19, 1964  H. B. LEWIS, JR  3,133,435
AIR DEAD WEIGHT TESTER

Filed May 28, 1956  3 Sheets-Sheet 3

INVENTOR.
HOWARD B. LEWIS, JR.
BY
Christie, Parker & Hale
ATTORNEYS

United States Patent Office 3,133,435
Patented May 19, 1964

3,133,435
AIR DEAD WEIGHT TESTER
Howard B. Lewis, Jr., La Canada, Calif., assignor, by mesne assignments, to Consolidated Electrodynamics Corporation, Pasadena, Calif., a corporation of California
Filed May 28, 1956, Ser. No. 587,654
4 Claims. (Cl. 73—4)

This invention relates to a pneumatic dead weight tester particularly useful as a primary standard of pressure measurement.

In the development of precision transducers, such as force balances and the like, some standard of calibration of equal or greater precision and sensitivity is required. To date, improvements in such primary standards have not kept pace with improvements in transducers. The heretofore normally accepted standards such as liquid level manometers, hydraulic dead weight testers and the like are proving inadequate for the purpose.

The air dead weight tester of the present invention provides a high degree of sensitivity and accuracy, and comprises a base, a cylinder rigidly affixed to the base and having a bore therein, a cylindrical piston slidably closing an end of the bore and extending outwardly from the cylinder, the piston being rotatable respect to the cylinder, means for admitting a gas into the interior of the bore to bear against the piston, and means to load the piston against any pressure differential between the interior and exterior of the cylinder. In one embodiment the piston includes a portion extending into an end of the cylinder bore. Preferably in this embodiment, the cylinder bore is in two sections, a first of relatively large diameter and a second of relatively smaller diameter through which the piston extends. A gas, the pressure of which is to to be measured, is admitted to the larger bore section. In another embodiment particularly suited to relatively low pressure application, the piston encloses and rotates about a portion of the exterior of the cylinder. In this type instrument, pressure in the cylinder bore bears against an inner portion of the piston overlying an end of the bore. No advantage is gained in this instance in provision of the stepped bore.

The system of the invention is much more accurate than a hydraulic tester because of the lower viscosity of the gaseous fluid. Further, hydraulic systems exhibit a critical dependence on piston displacement because of consequent variations in hydraulic head, a limitation of which the gas system of the present invention is essentially free. A still further advantage of the pneumatic system is that there is no problem of isolation of a transducer under test from the fluid in the tester as is frequently the case with a hydraulic system.

In its preferred form the tester of the invention includes means for tilting the cylinder and piston assembly to provide a simple means of pressure range variation, motor driven means for intermittently rotating the piston assembly, units of weight enabling adjustments of piston load in increments of 1% of full scale pressure range, and an evacuable housing enclosing the cylinder and piston to permit measurement of absolute pressures.

The pneumatic dead weight tester of the invention will be clearly understood from the following detailed description taken in conjunction with the accompanying drawings, in which.

Figure 2:
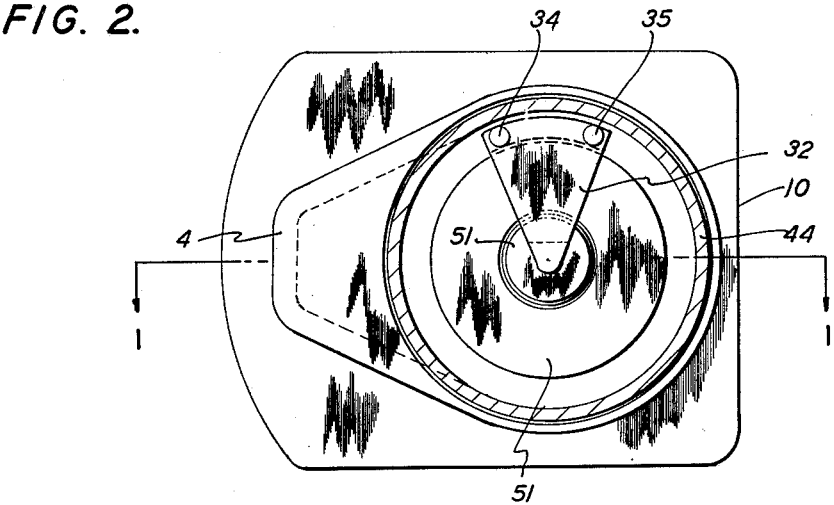
FIG. 2 is a horizontal section taken on the line 2—2 of FIG. 1.
Figure 1:
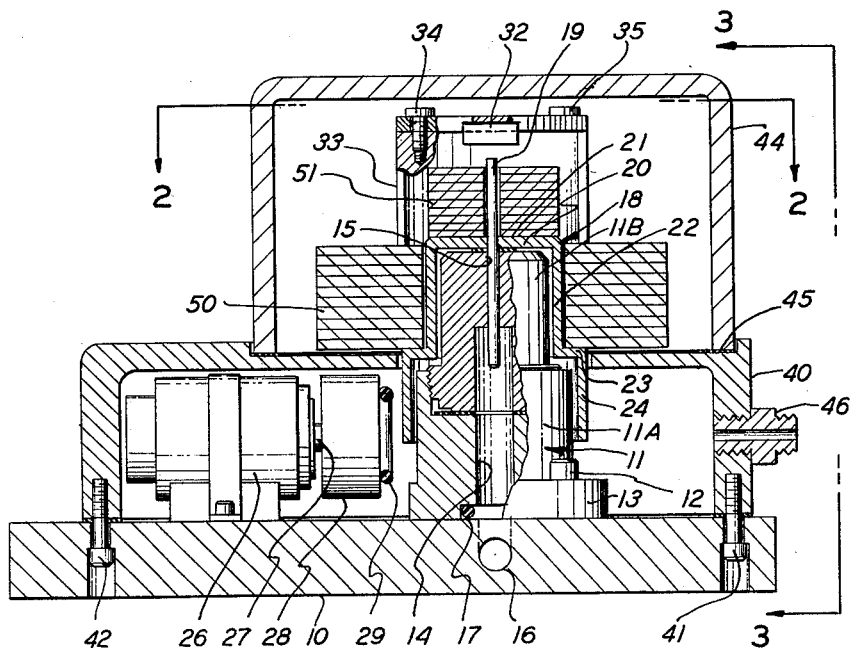
FIG. 1 is a vertical section through one embodiment of the invention.
Figure 3:
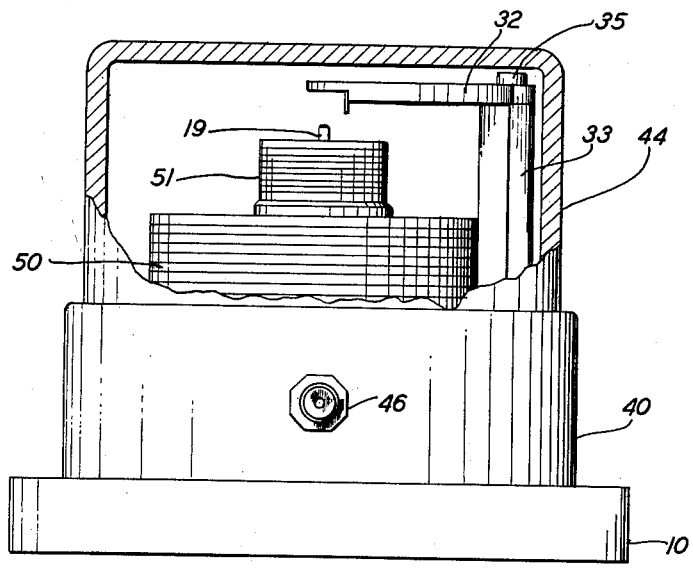
FIG. 3 is an end elevation partially cut away, taken on the line 3—3 of FIG. 1.

The unit illustrated in FIGS. 1, 2 and 3 comprises a relatively heavy base plate 10 to which a cylinder 11 is rigidly affixed as by bolts 12 passing through a flange 13 on the lower end of the cylinder and into the base. The term "cylinder" is applied to element 11 of the apparatus to indicate function and not shape. The cylinder may have any desired external configuration and the specification and claims are to be so construed. The cylinder as illustrated may be constructed of two sections 11A and 11B which together define a first elongated bore 14 and a second elongated bore 15 of smaller diameter than the bore 14. A port 16 in the base 10 opens into the lower end of bore 14 of the cylinder, a gas seal being formed at the junction of the bore with the port 16 by means of an O ring 17. The port 16 opens through a side of the base 10 and provides means for introducing a gas, the pressure of which is to be measured into the bore in cylinder 11.

A piston assembly 18 includes an elongated piston rod 19 projecting through bore 15 and into the upper extremities of bore 14 and projecting outwardly from the upper end of cylinder section 11B. A stepped cylindrical shroud 20 is concentrically affixed about the piston rod 19 including a horizontally disposed central section 21 overlying the upper end of cylinder section 11B, an interconnected vertically disposed tubular section 22 surrounding cylinder section 11B, a horizontal annular section 23 extending outwardly from the lower extremity of cylinder section 22, and a second vertical cylindrical section 24 extending downwardly from the peripheral extremity of the horizontal annulus 23.

A drive motor 26 is rigidly mounted on the base, drive shaft 27 of the motor being connected to a centrifugal clutch 28 provided with a rotating annular drive bearing 29 adapted to engage section 24 of the piston shroud. The centrifugal clutch is such that upon energizing the motor, the clutch will displace axially to engage the lower section of the piston shroud. Upon reaching the desired speed, the motor is turned off, the clutch disengages, and the piston assembly rotates free of my constraint except the viscous friction of the gas and which gas forms a lubricating film between the piston and cylinder surfaces.

An overtravel stop for the piston 18 is provided by an overhanging limit plate 32 mounted on an arcuate support 33 with bolts 34, 35.

The entire assembly is preferably enclosed within an airtight housing consisting of a first housing member 40 anchored to the base 10 with bolts 41, 42 and a second housing member 44 seating on and sealed to the housing section 40 by means of an annular gasket 45. A nipple 46 is provided through the housing 40 so that the latter can be evacuated or pressurized to permit measurements of absolute pressures or differential pressures of any comparison.

The piston rod 19 and the small diameter bore 15 of the cylinder are carefully honed to a fine tolerance, the clearance between the two being approximately 40 microinches. It is to facilitate this procedure that the cylinder is conveniently fabricated in two sections.

In operation, gas at a pressure in excess of that within housing 40, 41 is admitted through port 16 into the lower bore section 14 of the cylinder, thus bearing on the lower extremity of the piston rod 19. Rotation of the piston assembly is initiated by energizing motor 26, the motor being shut off so as to disengage the clutch after a predetermined r.p.m. is achieved. With the piston spinning freely it will lift from rest position at a pressure in chamber 14 predetermined by the effective area of the piston. To achieve a range of pressure response a plurality of weights 50 and a second plurality of weights 51 are provided to load the piston against the air lift. The static pressure applied becomes known from the total weight of the system, including added weights, when the rotating piston is supported by the air in bore 14 and is at rest vertically. A continuous rotation during a measurement is necessary to minimize friction. This can be done manually as the unit will coast for in excess of 30 seconds upon an initial rotary impulse, but preferably it is accomplished by a motor and clutch arrangement, as shown.

Figure 6:
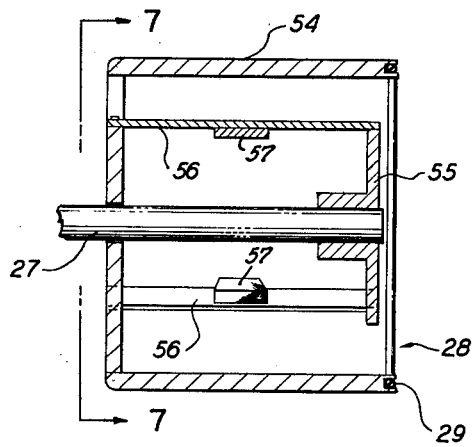
FIG. 6 is a schematic sectional elevation of one type of centrifugal clutch.
Figure 7:
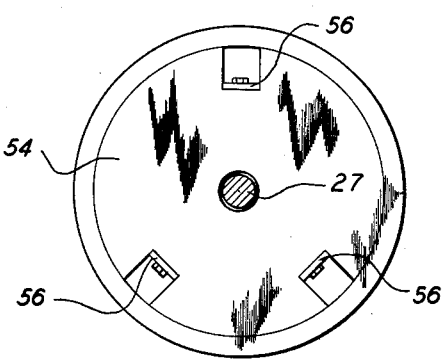
FIG. 7 is an end view taken on the line 7—7 of FIG. 6.

Centrifugal clutch 28 is shown schematically in FIGS. 6 and 7. The clutch includes a housing 54 rotatably and slidably mounted on motor shaft 27. The leading face of the housing carries the drive ring 29 which bears against the piston assembly in the engaged position. A sleeve 55 is fastened to the motor shaft, and a plurality of leaf springs 56 are connected between the sleeve and the inner end of the housing as illustrated. Weights 57 are suspended from the springs with the consequence that the housing is shifted longitudinally of the shaft as a function of its r.p.m.

A feature of the invention is that each of the weights 50 is equal to the total weight of the piston assembly and is shaped so that 10 may be added as indicated. Further, each of the weights 51 represents 1/10 of the weight of each of the weights 50, again the piston being of sufficient length to accommodate 10 of the weights 51. By this means, adjustments of the unit may be made in 1% increments of full scale.

One embodiment of the unit which has been tested utilized a piston of .126 inches in diameter for a displacement area of approximately .0125 square inches. With this unit the weight to pressure conversion was 1 oz.=5 p.s.i.

An important feature of the invention is the extension of the piston rod into the upper extremity of the cylinder bore 14. By this means displacement of the piston to a free-running position by gas pressure in the bore 14 does not alter the extent of the bearing surface between the piston and the cylinder. Thus, there is no problem of reproducible piston position as would be required if the bearing surface were varied as a result of different free-running rest positions.

Figure 4:
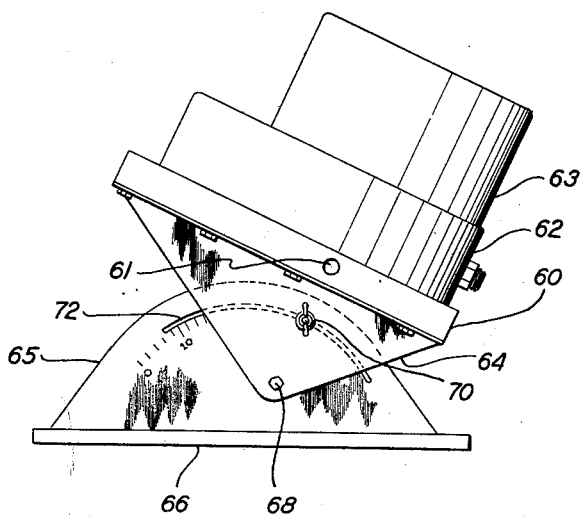
FIG. 4 is an elevation of an alternative embodiment of the invention.

The embodiment of the invention shown in FIG. 4 differs from that above described only in the manner of mounting the unit for use. This tester includes a base 60 corresponding to base 10 of the above described device, the base having a port 61 for introduction of a gas under test and supporting housings 62, 63 in which the elements above described are enclosed. In this embodiment the base 60 is mounted by means of wing plate 64 to a supporting stand 65, in turn supported on a base 66. Wing plate 64 is pivotally mounted at 68 to the stand 65 and is further connected to the stand through a wing nut 70 riding in an arcuate slot 72 in the stand plate 65. This embodiment represents a simple mechanical expedient enabling the base plate 60 of the tester itself to be inclined from the horizontal.

Inclination of the unit as may be done with the apparatus of FIG. 4 modifies or reduces the effect of gravity, thereby lowering the pressure range of the system. The side loading of the piston resultant on the inclination thereof from vertical, necessitates an increase in the r.p.m. of the piston necessary to establish the required air bearing. However, once the air bearing is established the effects of side loading are eliminated. The pressure range of a given unit may be varied different degrees by different degrees on inclination, the variation being a function of the cosine of the angle of inclination from vertical. As an example, a unit with a 1¼ inch piston exhibited a pressure range in vertical orientation from .2 to 5 p.s.i. full scale. When tilted to an angle of approximately 84° the range became .02 to .2 p.s.i.

Figure 5:
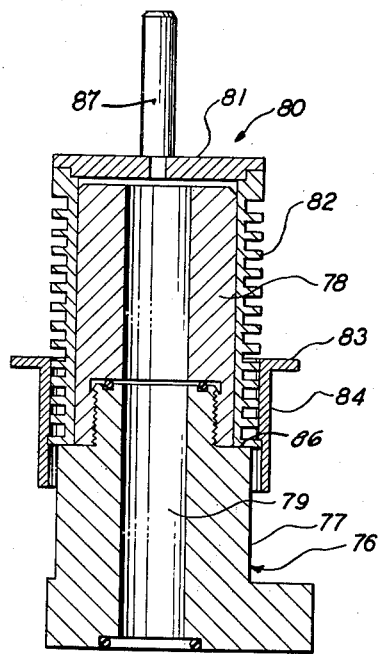
FIG. 5 is a sectional elevation through a modified form of cylinder and piston assembly.

A modified form of cylinder and piston assembly is shown in sectional elevation in FIG. 5. This modification is characterized by a large piston displacement area per unit weight of the piston and is therefore particularly suited for low pressure application. Cylinder 76 in FIG. 5 consists of two sections 77, 78 through which a central bore 79 is formed, in this instance the bore is of uniform diameter since no advantage is realized from a stepped bore. A piston assembly 80 includes a center plate 81, a depending cylindrical shroud 82, an annular weight platform 83, and a further depending drive skirt 84. The lower end of shroud section 82 rests upon an external shoulder 86 formed between the two cylinder sections. A spindle 87 extends from plate 81 for retaining weights (not shown) on the plate.

In this embodiment the mating surfaces of cylinder section 78 and shroud 82 are formed and polished to a fine tolerance, and a pneumatic bearing is formed therebetween, as in the above-described embodiments, as gas escapes from bore 79.

The enclosure of the cylinder and the piston assembly as illustrated is not a requirement of the device. The portion of the piston exterior of the cylinder need not be disposed in an evacuated area. However, it is conveniently so enclosed since by evacuating the housing it is possible to measure absolute pressures and further by connecting the housing to one pressure source and the interior of the cylinder to another source, differential pressures may be measured.

I claim:

1. An air dead weight tester comprising a base, a cylinder affixed to the base and having first and second bores of respectively relatively large and relatively small diameter, a cylindrical piston slidable in the second bore and extending outwardly and inwardly therefrom, the piston being rotatable in the bore and extending into the first bore a distance in excess of the piston displacement during operation of the tester, a first annular ring connected to and extending horizontally from the piston and forming a first table, a first cylindrical skirt depending from the periphery of the first ring, a second annular ring connected to and extending from the first skirt beneath the first table and forming a second table, a second cylindrical skirt depending from the second ring, means operable to rotate the second skirt, means for admitting a gas into the first bore to bear against the inner end of the piston, a first plurality of annular weights adapted to be applied to the first table, and a second plurality of annular weights adapted to be applied to the second table to load the piston in opposition to pressure against its inner end.

2. Apparatus according to claim 1 wherein each of the second plurality of weights equals the weight of the piston assembly and each of the first plurality of weights equals one-tenth the weight of the piston assembly.

3. An air dead weight tester comprising a stand, a base pivotally mounted in the stand, a cylinder rigidly affixed to the base and extending normal to the plane of the base and to the axis of rotation of the base in the stand, the cylinder having a first bore extending longitudinally therein from the base and a second bore of smaller diameter than the first bore extending coaxially from the first bore to the end of the cylinder, means communicating through the base for admitting a gas into the first bore, a piston rotatably mounted in the second bore and including a cylindrical rod extending through the second bore into the first bore and outwardly of the second bore, the extension of the piston into the first bore exceeding the displacement of the piston during operation of the tester, a cylindrical hood affixed to the outwardly extending portion of the rod and forming a first weight-receiving table immediately around the rod, a second annular weight-receiving table supported outwardly of and below the first table from the first table and a cylindrical skirt below the second table, means including a motor and a clutch engaging the skirt for rotating the piston assembly, a plurality of first weights each equal to the weight of the piston assembly and shaped to rest on the second table, a plurality of second weights each equal to one-tenth the weight of the first weights shaped to rest on the first table, and a housing enclosing the cylinder and piston and having port means therein for gas flow into and out of the housing.

4. An air dead weight tester comprising a base, a cylinder affixed to the base and having first and second interconnected collinear bores of respectively relatively large and relatively small diameter, a cylindrical piston rotatable and slidable in the second bore and extending inwardly and outwardly therefrom, the piston extending into the first bore to an extent in excess of the displacement of the piston during operation of the tester, a cylindrical skirt depending from the piston, a motor and a clutch connected to be driven by the motor and to frictionally engage the skirt to produce rotation thereof and to disengage from the skirt at a predetermined r.p.m. of the skirt, means for admitting a gas into the bore to bear against the inner end of the piston, and means to load the piston in opposition to pressure against its inner end.

References Cited in the file of this patent
UNITED STATES PATENTS

| | | |
|---|---|---|
| 1,134,316 | Collette | Apr. 6, 1915 |
| 1,217,735 | Fisher | Feb. 27, 1917 |
| 1,935,508 | Lanham | Nov. 14, 1933 |
| 2,719,431 | Grant | Oct. 4, 1955 |
| 2,725,741 | Grant | Dec. 6, 1955 |
| 2,766,612 | Michels | Oct. 16, 1956 |

FOREIGN PATENTS

| | | |
|---|---|---|
| 713,657 | Great Britain | Aug. 18, 1954 |

OTHER REFERENCES

Product Eng., Aug. 1951, pp. 112–115, Air Digest Mechanical-Engineer's Handbook (5th Edition) by L. A. Marks, copyright 1951 pp. 902–904.